(12) United States Patent
Lee et al.

(10) Patent No.: US 7,502,561 B2
(45) Date of Patent: Mar. 10, 2009

(54) LOCKING UNIT FOR A DISPLAY UNIT IN AN IMAGE PHOTOGRAPHING APPARATUS

(75) Inventors: Dong-seok Lee, Seoul (KR); Sang-ki Min, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 409 days.

(21) Appl. No.: 11/350,855

(22) Filed: Feb. 10, 2006

(65) Prior Publication Data

US 2007/0009254 A1 Jan. 11, 2007

(30) Foreign Application Priority Data

Jul. 5, 2005 (KR) ...................... 10-2005-0060073

(51) Int. Cl.
*G03B 17/02* (2006.01)

(52) U.S. Cl. .................................. 396/536; 348/333.06

(58) Field of Classification Search ................. 396/287, 396/439, 419, 536, 535, 541; 292/DIG. 4, 292/DIG. 37, DIG. 11, 137, 145, 146, 150, 292/163, 177, 304; D16/217; 348/333.06, 348/333.07

See application file for complete search history.

(56) References Cited

U.S. PATENT DOCUMENTS

| 5,982,429 | A * | 11/1999 | Kamamoto et al. ..... 348/333.06 |
| 2002/0181722 | A1* | 12/2002 | Hibino et al. .................. 381/92 |
| 2004/0075281 | A1* | 4/2004 | Ueki ........................... 292/65 |
| 2005/0018067 | A1* | 1/2005 | Lee ........................ 348/333.06 |
| 2005/0174477 | A1* | 8/2005 | Amano et al. ................ 348/375 |
| 2006/0255599 | A1* | 11/2006 | Su et al. ...................... 292/304 |

FOREIGN PATENT DOCUMENTS

| JP | 11-133493 | 5/1999 |
| JP | 11-146236 | 5/1999 |
| JP | 2004215115 | 7/2004 |
| KR | 130210 | 12/1996 |
| KR | 20-0273144 | 10/1999 |
| KR | 10-2003-7005215 | 3/2004 |

OTHER PUBLICATIONS

Kazuhiko Kawase, Cover Mechanism of Recording Medium Insertion Slot Part, Jul. 31, 2003, Publication No. JP2003-319238.*

* cited by examiner

*Primary Examiner*—Christopher E Mahoney
*Assistant Examiner*—Fang-Chi Chang
(74) *Attorney, Agent, or Firm*—Roylance, Abrams, Berdo & Gooman, L.L.P.

(57) ABSTRACT

An image photographing apparatus includes an apparatus main body having a mounting portion. A display unit having a display is mounted on the mounting portion. The display unit can be positioned at first pose where the display unit faces the bottom surface of the mounting portion, or at a second pose where the display unit faces away from the bottom surface of the mounting portion. A hinge unit connects the display unit to the main body so that the display unit is openable and closable to and from the mounting portion with respect to a first axis. The hinge unit also has a second axis that allows the display unit to be moved from the first pose to the second pose. A locking unit locks the display unit mounted on the mounting portion in the first or second pose.

13 Claims, 5 Drawing Sheets

LOCKING UNIT FOR A DISPLAY UNIT IN AN IMAGE PHOTOGRAPHING APPARATUS

CROSS-REFERENCE TO RELATED APPLICATIONS

This application claims the benefit under 35 U.S.C. § 119(a) of Korean Patent Application No. 2005-60073, filed on Jul. 5, 2005, the entire contents of which are hereby incorporated by reference.

BACKGROUND OF THE INVENTION

1. Field of the Invention

The present invention generally relates to an image photographing apparatus. More particularly, the present invention relates to an image photographing apparatus provided with a display unit for displaying an image that is attached to the main body of the image photographing apparatus so that it may be opened and closed.

2. Description of the Related Art

In general, an image photographing apparatus such as a camcorder records an image of a subject that is being photographed onto a recording medium (such as a tape, a hard disk, a CD, a memory card, or the like) and plays the recorded video data. To keep abreast with recent trends and technical advances in recording media, image photographing apparatuses now being developed are small, light, and use disks or memory cards. These image photographing apparatuses have a separate display unit in addition to a view finder a user (that is, a photographer) looks through to compose the scene. Here, the display unit displays an image being photographed by the image photographing apparatus, or displays the playback of a previously recorded image.

The main body of an image photographing apparatus has a mounting portion to which the display unit is attached so that it is openable and closable. On the mounting portion, the display unit in a closed state rotates back and forth about 90° with respect to a first axis, and the display unit in an open state also rotates with respect to a second axis that is substantially orthogonal to the first axis.

In other words, the display unit is installed in such a manner that its display surface either faces the mounting portion, or is positioned against the mounting portion.

The main body also includes a locking unit for locking the display unit, so that the display unit does not freely (or arbitrarily) open. Typically, the locking unit is installed at the display unit, or in the main body.

Meanwhile, a recording medium such as a memory card is usually inserted into the main body via a memory card slot. Unfortunately though, if the memory card slot is formed near the mounting portion, it is not easy to create a space for installing the locking unit in the main body. Therefore, the size of the main body is increased to accommodate the locking unit and as a result, the overall appearance of the image photographing apparatus may be unappealing.

Although the locking unit may be installed at the display unit, in that case the size of the display unit also has to be increased and the display unit may be unattractive.

Accordingly, there is a need for an improved locking mechanism for a display unit in an image photographing apparatus.

SUMMARY OF THE INVENTION

An aspect of the present invention is to address at least the above problems and/or disadvantages and to provide at least the advantages described below. Accordingly, an aspect of the present invention is to provide an image photographing apparatus with an improved structure, in which a display unit is locked to the main body of the image photographing apparatus through a simple configuration.

In accordance with an exemplary embodiment, an image photographing apparatus includes an apparatus main body, a display unit, a hinge unit, and a locking unit. The apparatus main body has a mounting portion. The display unit has a display and is mounted on the mounting portion. The display unit may be placed into a first pose in which the display faces the bottom surface of the mounting portion or a second pose in which the display faces away from the bottom surface of the mounting portion. The hinge unit connects the display unit to the main body so that the display unit is openable from and closable to the mounting portion with respect to a first axis and is changeable from the first pose to the second pose with respect to a second axis. The locking unit locks the display unit mounted on the mounting portion in the first or second pose.

A first and a second locking groove may be formed on the outside of the display unit at different heights with respect of the first-axis, and the locking unit may be selectively locked to one of the first locking groove and the second locking groove, depending on the pose of the display unit.

The locking unit may be offset, in parallel to the first-axis direction, with respect to the center of the width of the mounting portion.

The apparatus may further include a door rotatably installed on the bottom of the mounting portion for opening and closing a memory card slot formed adjacent to the locking unit.

The locking unit may includes a locking knob which slides in and out of the main body through a guide hole formed in the rear surface of the main body. The locking knob may be selectively locked to one of the first locking groove and the second locking groove. A pressing member may be installed in the main body to press the locking knob towards the first and second locking grooves. A cover may be disposed inside the main body to guide and support the movement of the locking knob, and to restrain the pressing member.

In addition, a position determining rib may protrude from the inner wall of the main body to indicate a cover mounting position.

Also, a pair of guide ribs for guiding the movement of the locking knob may protrude from the inner wall of the main body.

In an exemplary embodiment, the locking knob may include a locking part, which is exposed to the outside of the main body and is selectively locked to one of the first and second locking grooves. A guiding part extends from the locking part and is installed in a manner to be able to move in and out through a guide hole in the cover, and has a slot where the pressing member is installed. A suspending link extends from the guiding part and restrains the locking knob within the locking unit.

In an exemplary embodiment, the cover may include a support projection for supporting one end of the pressing member inserted into the slot in the locking knob. A guide hole may be formed on the opposite side as the support projection to prevent the suspending link from escaping.

In accordance with another exemplary embodiment, an image photographing apparatus comprises a main body, display unit, a hinge unit, and a locking unit. The main body comprises a mounting portion. The display unit comprises a first locking groove and a second locking groove. The hinge unit connects the display unit to the main body, and the hinge unit has a first axis for allowing the display unit to be opened and closed with respect to the main body and second axis which is substantially orthogonal to the first axis. The locking unit comprises a locking knob with a guiding part and a locking part. The locking part has a locking projection which cooperates with the first and second locking grooves to lock the display unit into position.

A memory card slot may be disposed in the main body, and the memory card slot may be located adjacent to the locking unit. An openable door may cover the memory card slot.

A pair of guide ribs may extend from the main body to cooperate with the guiding part of the locking knob to guide the movement of the locking knob.

A cover for fastening the locking knob into the main body may be provided.

The cover may comprise a guide hole, and the locking knob may further comprise a suspending link extending through the guide hole in the cover. The suspending link prevents the locking knob from escaping.

A pressing member may be located in a slot in the locking knob, and the pressing member may bias the locking knob towards the first and second locking grooves.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, the same reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
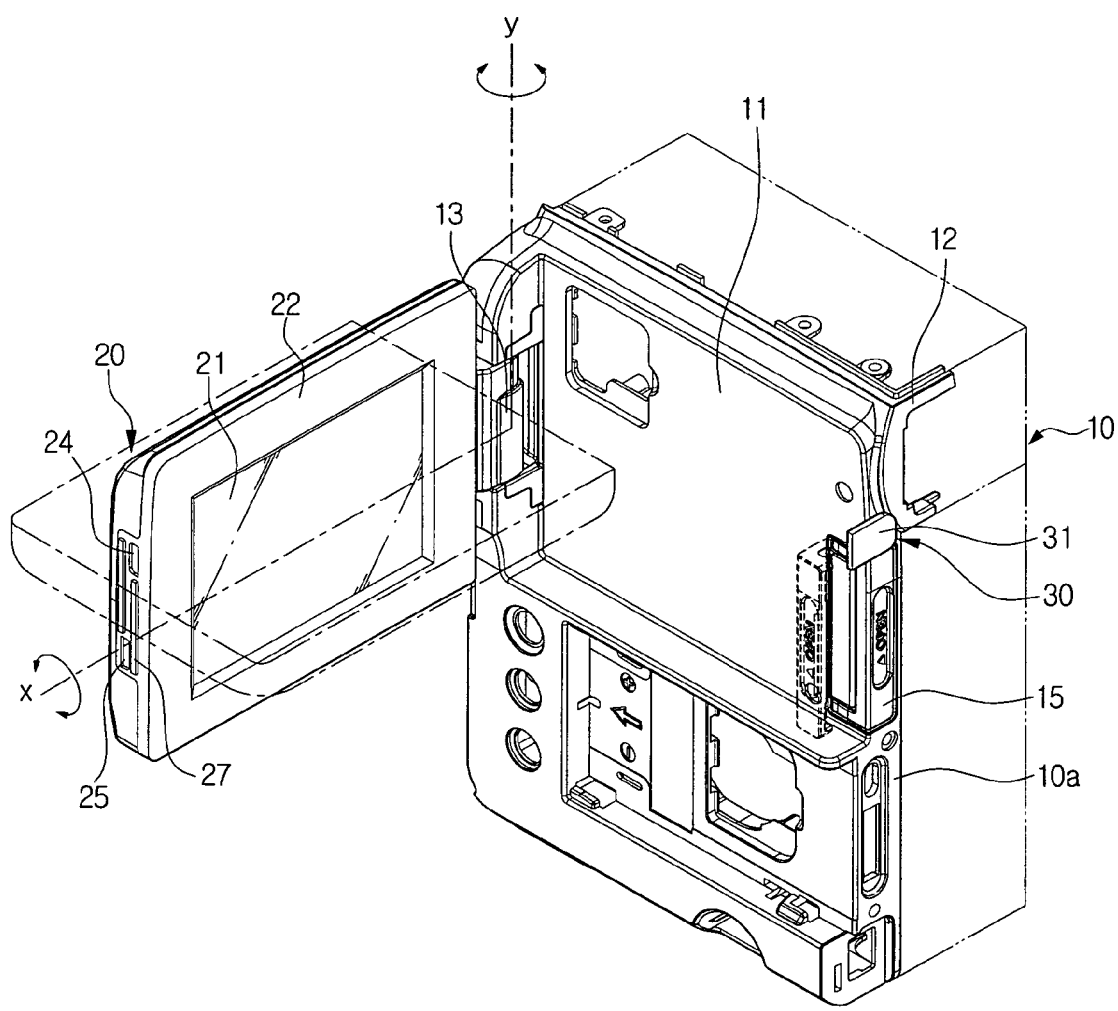
FIG. 1 is a schematic perspective view of an image photographing apparatus according to an exemplary embodiment of the present invention.
Figure 2:
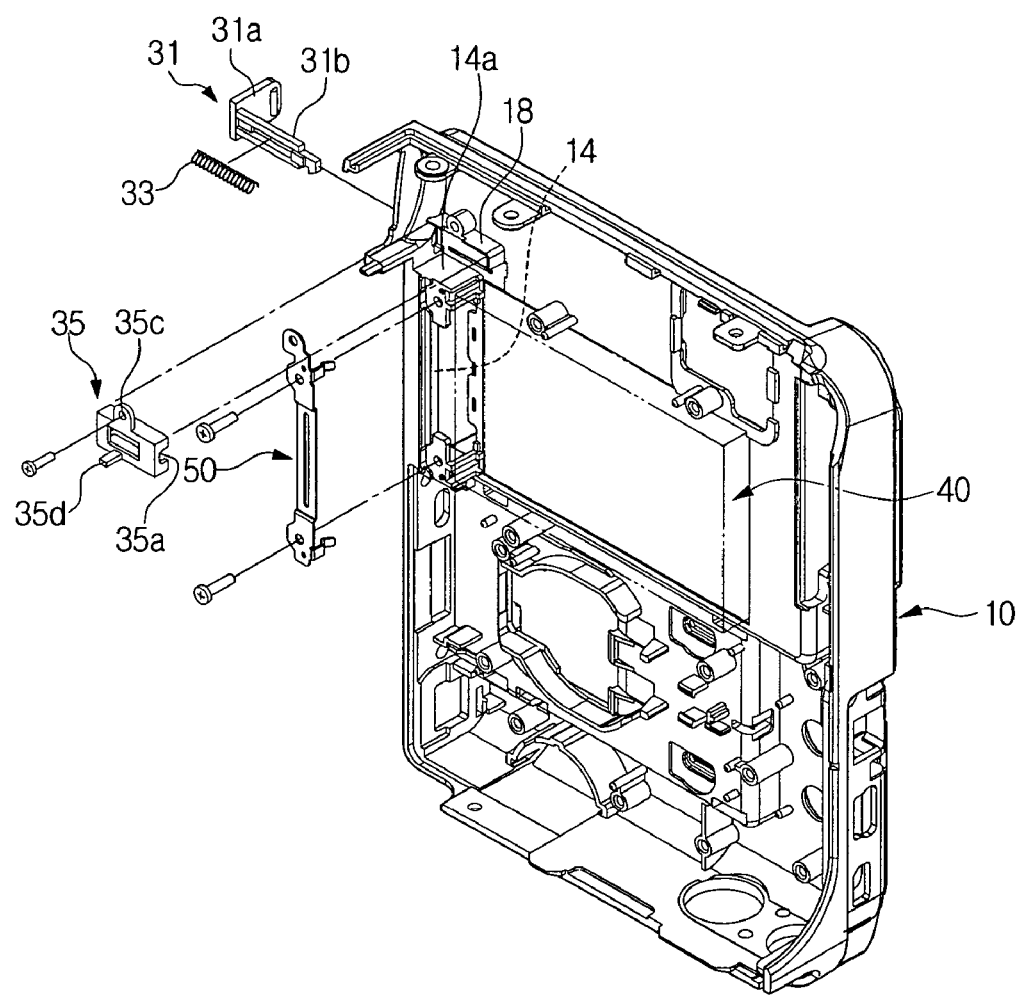
FIG. 2 is an exploded perspective view of certain components of the image photographing apparatus of FIG. 1.
Figure 3:
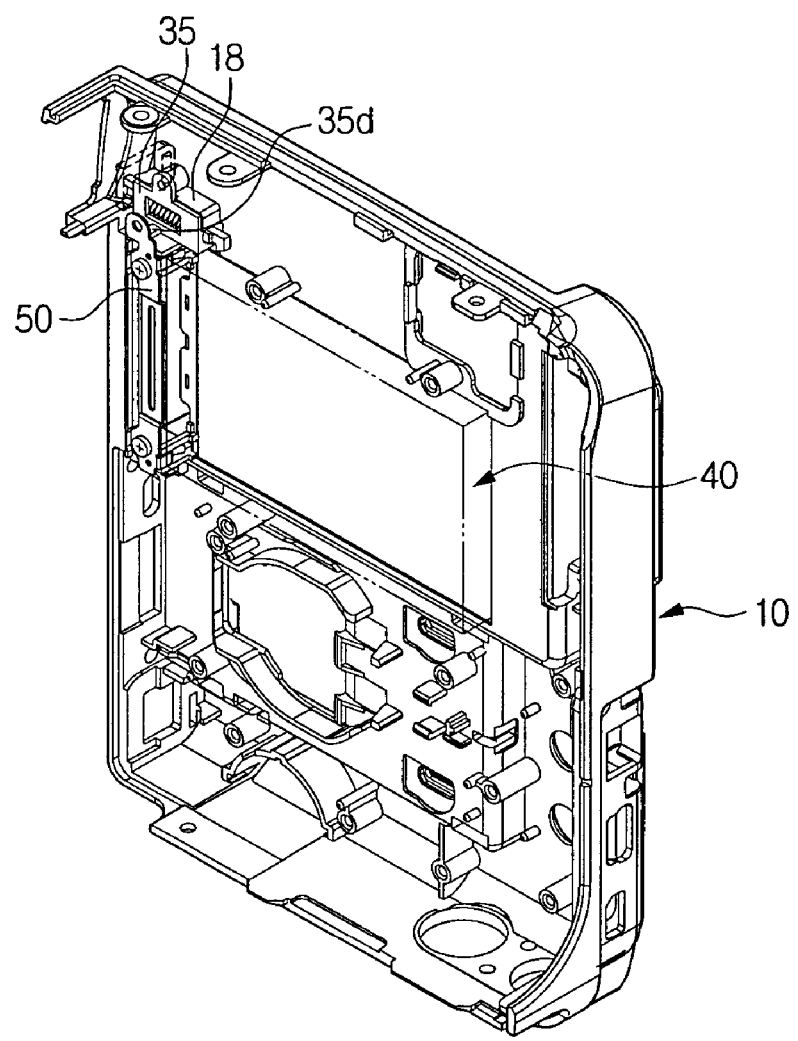
FIG. 3 is a perspective view of the inside of the main body of the image photographing apparatus of FIG. 1, in which the components of the image photographing apparatus are assembled.

An exemplary embodiment of the present invention will now be described with reference to the accompanying drawings. Referring to FIGS. 1, 2, and 3, an image photographing apparatus includes a main body 10, a display unit 20, and a locking unit 30 for locking and unlocking the display unit 20 to and from the main body 10.

The main body 10 includes a mounting portion 11 on one side of the display unit 20. The mounting portion 11 has substantially the same shape as the display unit 20, and is formed at a predetermined depth from the outside of the main body 10.

On one side of the mounting portion 11, there is a hinge unit 13 for supporting biaxial rotation of the display unit 20. That is, the hinge unit 13 supports the display unit 20 to be able to rotate with respect to an X-axis (first axis) and a Y-axis (second axis) that are substantially orthogonal to each other.

In addition to the above, the main body 10 also includes a camera unit (not shown) for photographing a subject and thus obtaining image data, a viewfinder (not shown) that a user looks through to compose a scene, and an image processing device and a recording medium for recording and reproducing the obtained image data. A viewfinder cap 12 is provided at the entrance of the viewfinder.

A door 15 opens and closes a memory card slot 14 (see FIG. 2) through which a memory card 40 is inserted. Memory card 40 is an example of a recording medium. The door 15 extends from the bottom surface of the mounting portion 11 to a rear surface 10a of the main body 10. As shown in broken lines in FIG. 1, the door 15 is installed rotatably towards the mounting portion 11 to be able to open the memory card slot 14.

The display unit 20 includes a display 21 and a case 22 for supporting the display 21. The display 21 displays image data being photographed by the camera unit, or image data stored in the recording medium (e.g., memory card 40). Typically, the display 21 includes an LCD.

The display unit 20 is installed in such a manner that it can rotate by about 90° with respect to the Y-axis and about 270° with respect to the X-axis. Therefore, the display unit 20 can be mounted on the mounting portion 11, and face the bottom surface of the mounting portion 11 (a first pose), or can face away from the bottom surface of the mounting portion 11 (a second pose).

The locking unit 30 securely locks the display unit 20 to the mounting portion 11, so that the display unit 20 may not be freely opened. The locking unit 30 includes a locking knob 31 which slides in and out of the main body 10 through a guide hole 17 that penetrates the rear surface 10a of the main body 10, a pressing member 33 for elastically pressing the locking knob 31 towards the inside of the main body 10, and a cover 35 disposed inside the main body 10 for encompassing and supporting the pressing member 33 and the locking knob 31.

Figure 4A:
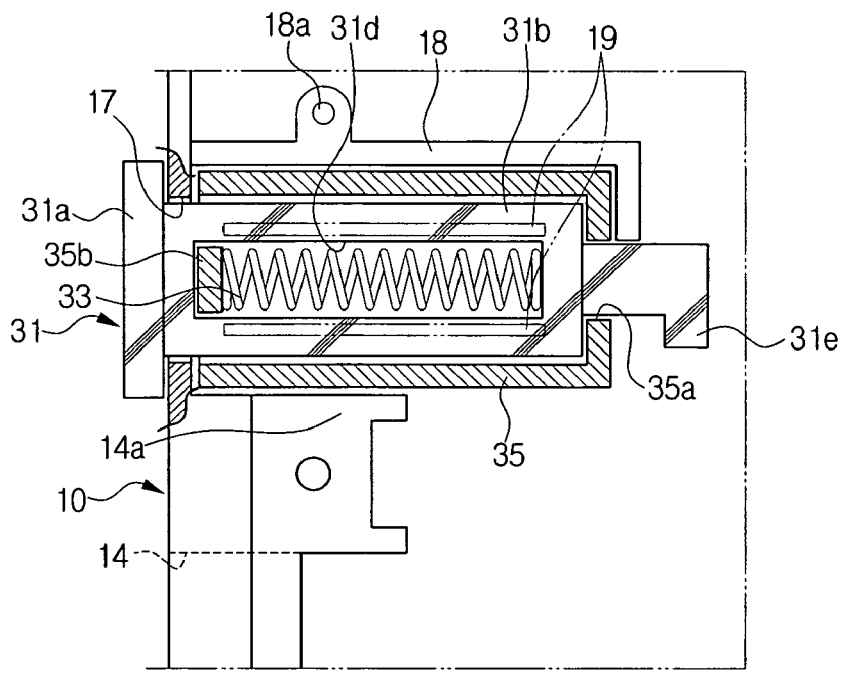
FIG. 4A and FIG. 4B are cross-sectional views of the locking unit shown in FIGS. 2 and 3, with the locking unit attached to a display unit.
Figure 4B:
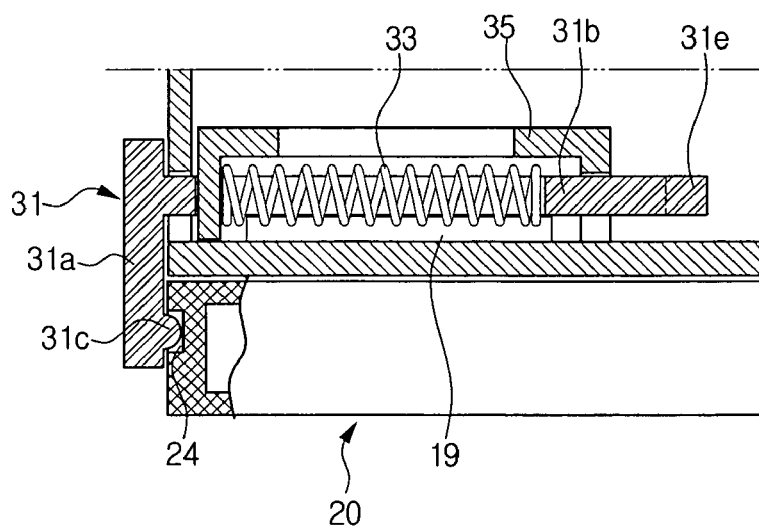

Referring now to FIGS. 4A and 4B, the locking knob 31 has a locking part 31a which is exposed to the outside of the main body 10, a guide part 31b which extends from the locking part 31a and is installed slidably in the main body 10, and a locking projection 31c locked to one of first and second locking grooves 24, 25 that are formed in the case 22 of the display unit 20.

Since the door 15 is installed at the rear side 10a of the main body 10, the guide hole 17 is formed on an upper portion of the door 15. The locking unit 30 is installed closer to the upper portion of the mounting portion 11 with respect to Y-axis. Therefore, the first and second locking grooves 24, 25 are formed on one side of the case 22 of the display unit 20, and are substantially vertically symmetrical with respect to the center of Y-axis. Thus, the locking grooves correspond to the locking projection 31c of the locking knob 31. In short, depending on whether the display 21 faces the mounting portion 11 or faces away from the mounting portion 11, the locking projection 31c is locked to one of the locking grooves 24, 25.

The guide part 31b of the locking knob 31 is inserted into the main body 10 through the guide hole 17, and slides in and out of the main body 10 while being inserted. A slot 31*d* is formed in the sliding direction of the guide part 31*b*, and a bent suspending link 31*e* is formed on the inner end portion of the guide part 31*b*. The pressing member 33, for example, a coil spring, is placed in the slot 31*d*. As shown in FIG. 4A, the end of suspending link 31*e* is bent so that it does not slide out of a guide hole 35*a* (described in detail below) of the cover 35. In this manner, the guide part 31*b* does not easily slide from the guide hole 17, yet it can still slide inside the main body 10 within a predetermined distance.

Figure 5A:
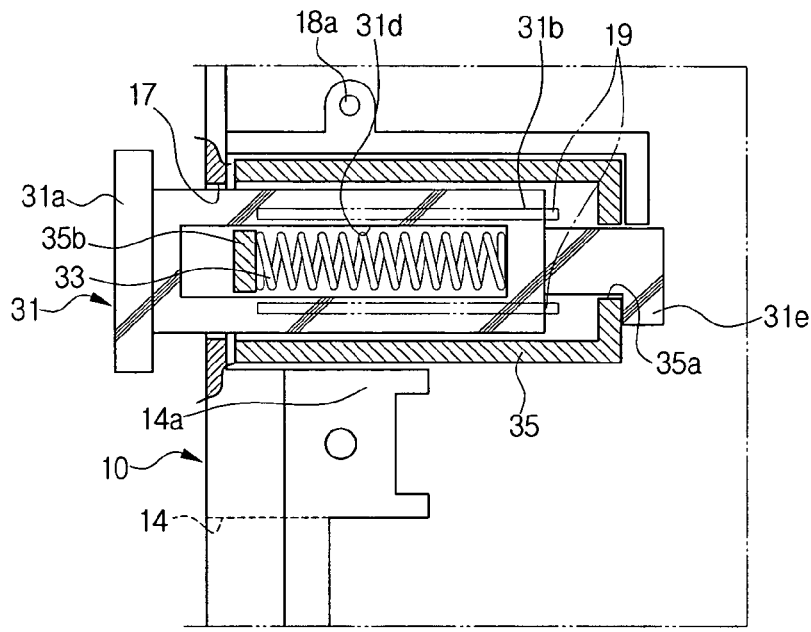
FIG. 5A and FIG. 5B are cross-sectional views of the locking unit shown in FIGS. 2 and 3, with the locking unit separated from a display unit.
Figure 5B:
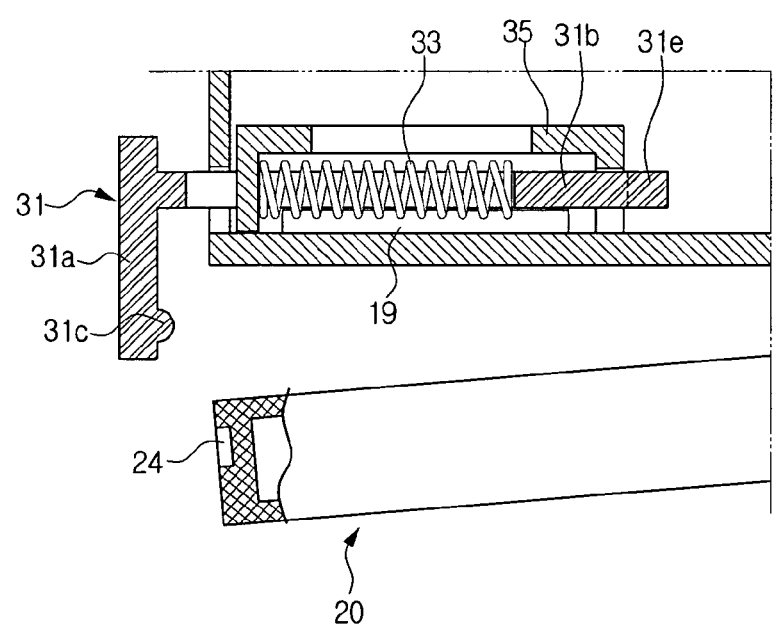

The pressing member 33, which is placed in the slot 31*d*, elastically presses the locking knob 31 to restrain the locking knob 31 from escaping the main body 10. When the pressing member 33 is placed in the slot 31*d*, one end comes in contact with the guide part 31*b*, and the other end contacts and is supported by the cover 35. Therefore, as shown in FIGS. 5A and 5B, when the locking knob 31 is drawn out of the main body 10 by a predetermined distance, the pressing member 33 is compressed by the cover 35.

The cover 35 is fastened to the main body 10 with suitable fastening members, such as screws. It covers part of the locking knob 31 and the pressing member 33 to restrain and guide their motions. In detail, the cover 35 is fastened to the inner wall of the main body 10, and has a guide hole 35*a* into which the suspending link 31*e* is inserted and guided and a support projection 35*b* that contacts and supports one end of the pressing member 33. Moreover, the cover 35 has a fastener hole 35*c* extended to the outside.

A position determining rib 18 is disposed inside the main body 10, indicating where to mount the cover 35. The position determining rib 18 has a locking boss 18*a* which corresponds to the fastener hole 35*c*. Thus, the locking boss 18*a* also has a fastener hole. The cover 35, together with the position determining rib 18, is guided and supported by an outer wall 14*a* of the memory card slot 14 that protrudes from the inner wall of the main body 10. And, as shown in FIGS. 2 and 3, a bracket 50 supports the rotation of the door 15 inside the main body 10, and an end of the bracket 50 presses a protruding support projection 35*d*. In this manner, although the cover 35 may be locked with only one fastener, it can be securely immobilized.

In addition, a pair of guide ribs 19 for guiding the movement of the guide part 31*b* protrude from the inner wall of the main body 10. The guide ribs 19 protrude from the inner wall of the main body 10 by about 1-2 mm, for example, and are formed substantially parallel to one another, being separated from each other.

The operation of the image photographing apparatus having the above-described configuration will now be described.

The first and second locking grooves 24, 25 are formed at different heights on the outside of the display unit 20, and the locking unit 30 is provided to the upper portion of the door 15. That is, a larger part of the locking unit is formed at the upper portion of the mounting portion 11. Therefore, as shown in FIG. 1, when the display unit 20 in the first pose is mounted on the mounting portion 11, the locking unit 30 is locked to the first locking groove 24.

At this time, by the closing force of the display unit 20, the locking part 31*a* is momentarily drawn in and out of the main body 10, and as illustrated in FIGS. 4B and 5B, the locking projection 31*c* and the first locking groove 24 are locked together as in a one-touch system, for example.

When the locking projection 31*c* and the first locking groove 24 are locked, the compressive force of the pressing member 33 prevents the locking projection 31*c* from inadvertently moving out of the locking groove 24.

If a user wants to open the display unit 20, the user may put his or her hand on a friction rib 27 around the first and second locking grooves 24, 25, and rotate the display unit 20 with respect to the Y-axis. Then, the display unit 20 is separated from the mounting portion 11 by force, and by this force the locking knob 31 is pulled out of the main body 10 as shown in FIGS. 5A and 5B, and the locking projection 31*c* moves out of the first locking groove 24. In other words, the user does not need to manually move the locking knob 31 because when he or she mounts the display unit 20 on the mounting portion 11 or opens the display unit 20 by force, the locking knob 31 moves due to the force originated from the user. As a result, the locking grooves 24, 25 and the locking projection 31*c* are either locked together or separated from each other.

The above-described structure of an exemplary embodiment of the image photographing apparatus of the present invention provides a way to install the locking unit of the display unit without interfering with the door to the memory card slot.

Moreover, because a plurality of locking grooves are formed in the display unit, the display unit is easily locked by the locking unit, regardless of the position of the display unit with respect to the mounting portion.

As for the locking unit, the pressing member may be installed in the main body and guided by the cover. In this manner, it is possible to minimize the exposure of the locking unit to the outside. Also, by making the bracket support part of the cover and the door, the total number of components may be reduced. Thus, according to the exemplary embodiment of the present invention, a smaller number of components may be used, the overall structure of the image photographing apparatus is simple and easy to assemble, and manufacturing productivity may be improved.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An image photographing apparatus, comprising:
a main body having a mounting portion with a bottom surface;
a display unit mounted on the mounting portion of the main body, the display unit having a display, the display unit being adapted to be positioned in a first pose where the display unit faces the bottom surface of the mounting portion and a second pose where the display unit faces away from the bottom surface of the mounting portion;
a hinge unit for connecting the display unit to the main body so that the display unit is rotatable about a first axis to open and close the display unit with respect to the mounting portion and is rotatable about a second axis to move the display unit from the first pose to the second pose; and
a locking unit for locking the display unit mounted on the mounting portion in the first pose or the second pose;
wherein a first locking groove and a second locking groove are formed on the outside of the display unit at different heights with respect to the first-axis; and
the locking unit comprises:
a locking knob that moves in and out of the main body through a guide hole formed in the rear surface of the main body, the locking knob being selectively locked to one of the first locking groove and the second locking groove;
a pressing member installed in the main body and biasing the locking knob toward an inside of the main body to lock the locking knob to the selected one of the first locking groove and the second locking groove; and a cover disposed inside the main body for guiding and supporting the movement of the locking knob.

2. The apparatus according to claim 1, wherein the locking unit is selectively locked to one of the first locking groove and the second locking groove, depending on the pose of the display unit.

3. The apparatus according to claim 2, wherein the locking unit is offset towards one side with respect to the center of the width of the mounting portion.

4. The apparatus according to claim 1, wherein the cover restrains the pressing member.

5. The apparatus according to claim 1, wherein an inner wall of the main body comprises a position determining rib for indicating a cover mounting position.

6. The apparatus according to claim 1, wherein the inner wall of the main body comprises a pair of guide ribs for guiding the movement of the locking knob.

7. The apparatus according to claim 1, wherein the locking knob comprises:

a locking part, which is exposed to the outside of the main body, the locking part being selectively locked to one of the first locking groove and the second locking groove;

a guiding part extending from the locking part, the guiding part being slidably installed in the guide hole in the main body, the guiding part comprising a slot where the pressing member is installed; and a suspending link which extends from the guiding part, the suspending link restraining the locking knob.

8. The apparatus according to claim 7, wherein the cover comprises:

a support projection for supporting one end of the pressing member inserted into the slot; and a guide hole formed on the opposite side of the support projection, the suspending link extending through the guide hole and restraining the suspending link.

9. The apparatus according to claim 1, further comprising:
a memory card slot formed adjacent to the locking unit; and
a door rotatably installed on the mounting portion for opening and closing the memory card slot.

10. An image photographing apparatus, comprising:

a main body comprising a mounting portion;

a display unit comprising a first locking groove and a second locking groove;

a hinge unit connecting the display unit to the main body, the hinge unit having a first axis for allowing the display unit to be opened and closed with respect to the main body and second axis which is substantially orthogonal to the first axis;

a locking unit comprising a locking knob that moves in and out of the main body, the locking knob having a guiding part and a locking part, the locking part having a locking projection, which selectively cooperates with the first locking groove and the second locking groove to lock the display unit into position;

a pressing member located in a slot in the locking knob, the pressing member biasing the locking knob toward an inside of the main body to lock the locking knob to the selected one of the first locking groove and the second locking groove; and a cover fastening the locking knob into the main body.

11. The apparatus according to claim 10, further comprising a memory card slot disposed in the main body, the memory card slot being located adjacent to the locking unit; and an openable door covering the memory card slot.

12. The apparatus according to claim 10, further comprising a pair of guide ribs extending from the main body, the guide ribs cooperating with the guiding part of the locking knob to guide the movement of the locking knob.

13. The apparatus according to claim 10, wherein the cover comprises a guide hole; and the locking knob further comprises a suspending link extending through the guide hole in the cover, the suspending link preventing the locking knob from escaping.

\* \* \* \* \*